United States Patent
Arend et al.

(10) Patent No.: US 7,353,456 B2
(45) Date of Patent: Apr. 1, 2008

(54) PROTOTYPE PAGE FOR SIMULATING NAVIGATION IN COMPUTER PROGRAMS

(75) Inventors: Udo Arend, Heidelberg (DE); Jens Baumgart, Wiesloch (DE); Bjoern Goerke, Muhlhausen (DE)

(73) Assignee: SAP AG (DE)

( * ) Notice: Subject to any disclaimer, the term of this patent is extended or adjusted under 35 U.S.C. 154(b) by 877 days.

(21) Appl. No.: 10/429,167

(22) Filed: May 2, 2003

(65) Prior Publication Data

US 2004/0012639 A1 Jan. 22, 2004

(30) Foreign Application Priority Data

May 2, 2002 (EP) .................................. 02009865

(51) Int. Cl.
*G06F 3/00* (2006.01)
(52) U.S. Cl. ...................................... 715/762; 715/731
(58) Field of Classification Search ................ 715/731, 715/737, 739, 738, 760, 762
See application file for complete search history.

(56) References Cited

U.S. PATENT DOCUMENTS

| | | | |
|---|---|---|---|
| 5,911,145 A * | 6/1999 | Arora et al. | 715/514 |
| 5,995,099 A | 11/1999 | Horstmann | |
| 6,308,188 B1 | 10/2001 | Bernardo et al. | |
| 2001/0037490 A1 | 11/2001 | Chiang | |
| 2003/0014440 A1 * | 1/2003 | Bussert et al. | 707/513 |

OTHER PUBLICATIONS

Michael Kisker, "UML basierte Spezifikation von Benutzerschnittstellen" Diploma Thesis, University of Paderborn, Paderborn Germany, 2001; English translation (*see* IDS descriptive).

Philippe Kruchten, "The 4+1 View Model of Archtecture," IEEE Software, Nov. 1995, 12 (6), pp. 42-50.

Hugh Beyer, Karen Holtzblatt, "Contextual design: defining customer-centered systems," (Table of Contents) Morgan Kaufmann Publishers, San Francisco 1998, Part 6, "Prototyping," http://books.elsevier.com/us//mk/us/.

Arturo Crespo, Eric Bier, "WebWriter: A browser-based editor for contructing Web applications," Computer Networks and ISDN Systems, North Holland Publishing Amsterdam, NL, vol. 28 (1996), No. 11, pp. 1291-1306.

Crespo, Arturo, et al., "WebWriter: A Browser-Based Editor for Constructing Web Applications," *Computer Networks and ISDN Systems*, 1996, vol. 28, pp. 1291-1306.

* cited by examiner

*Primary Examiner*—Sy D. Luu
*Assistant Examiner*—Thanh Vu
(74) *Attorney, Agent, or Firm*—Fountainhead Law Group, PC (57) ABSTRACT

A prototype page for simulating navigation between objects in a computer program. A selection of a distribution of presentation areas is received. A placement of first and second icon symbols in at least one of the presentation areas is received. The first and second icon symbols represent first and second objects, respectively, of a computer program. A placement of a navigation symbol is received. The navigation symbol represents a navigation between the first and second objects. Markup language code is provided for a prototype page. The code includes location indicating code corresponding to the distribution of presentation areas. The code includes picture code for first and second pictures corresponding to the first and second icon symbols, respectively. The markup language code further includes interaction code corresponding to the navigation symbol. The prototype page is capable of simulating the navigation between the first and second objects in the computer program.

31 Claims, 10 Drawing Sheets

PROTOTYPE PAGE FOR SIMULATING NAVIGATION IN COMPUTER PROGRAMS

This application claims priority from Patent Application Serial No. 02009865.3 filed May 2, 2002 in the European Patent Convention and entitled "PROVIDING CODE FOR PROTOTYPE PAGE FOR SUBSEQUENT PRESENTATIONS".

TECHNICAL FIELD

This invention relates to prototype pages simulating navigation in computer programs.

BACKGROUND

Computer program development often involves providing a model of the program tasks, especially a user interface model. Simplified, a first person—the designer (or "developer")—uses the model to design the program at design time. A second person—the user—later uses the program at use time. The program interacts with the user through presentations on an output device. Taking a computer screen as an example, the presentations may have windows, icons, menus, buttons, tool bars or the like. The presentations serve to convey information to the user (e.g., by icons) and receive control commands from the user (e.g., from buttons).

The user's requirements may for example relate to:
the layout structure of the presentations,
the navigation between presentations according to predefined sequences, and
the availability of program functions.

The designer should take user-requirements into account. It may therefore be desirable to simulate the program by prototypes at design time. A third person—the tester—may then use a prototype that corresponds to the above requirements. The prototype may have reduced functionality compared with the program.

However, providing a fully functional prototype may have disadvantages. The designer needs to have programming skills in order to provide such a prototype. If the testing reveals the need for changes, this may cause rewriting of the computer program. Accordingly, it may be desirable to automate prototype and program providing.

SUMMARY

The invention provides a prototype page capable of simulating navigation between objects in a computer program. The invention may be embodied in a method, a computer, or in computer software. In one general aspect, the invention provides a method of providing a prototype page capable of simulating navigation between objects in a computer program. The method comprises receiving a selection of a distribution of presentation areas to be used in a computer program. A placement of first and second icon symbols in at least one of the presentation areas is received, the first and second icon symbols representing first and second objects, respectively, of the computer program. A placement of a navigation symbol that graphically links the first and second icon symbols is received, the navigation symbol representing a navigation between the first and second objects in the computer program. Markup language code for a prototype page is provided. The markup language code includes location indicating code corresponding to the distribution of presentation areas, picture code for first and second pictures corresponding to the first and second icon symbols, respectively, the picture code being combined with the location indicating code. The markup language code further includes interaction code corresponding to the navigation symbol, wherein the prototype page is capable of simulating the navigation between the first and second objects in the computer program.

In a second general aspect, the invention provides computer software for providing a prototype page capable of simulating navigation between objects in a computer program. The software is tangibly embodied in at least one of a computer-readable medium and a propagated carrier signal. The software comprises instructions to perform operations comprising:

receive a selection of a distribution of presentation areas to be used in a computer program;

receive a placement of first and second icon symbols in at least one of the presentation areas, the first and second icon symbols representing first and second objects, respectively, of the computer program;

receive a placement of a navigation symbol that graphically links the first and second icon symbols, the navigation symbol representing a navigation between the first and second objects in the computer program; and provide markup language code for a prototype page, the markup language code including location indicating code corresponding to the distribution of presentation areas, picture code for first and second pictures corresponding to the first and second icon symbols, respectively, the picture code being combined with the location indicating code, the markup language code further including interaction code corresponding to the navigation symbol, wherein the prototype page is capable of simulating the navigation between the first and second objects in the computer program.

In a third general aspect, the invention provides a computer for providing a prototype page capable of simulating navigation between objects in a computer program. The computer comprises program instructions comprising an interaction module that, when executed by a processor, receives a selection of a distribution of presentation areas to be used in a computer program, receives a placement of first and second icon symbols in at least one of the presentation areas, the first and second icon symbols representing first and second objects, respectively, of the computer program, and that receives a placement of a navigation symbol that graphically links the first and second icon symbols, the navigation symbol representing a navigation between the first and second objects in the computer program. The computer further comprises program instructions comprising a code providing module that, when executed by a processor, provides markup language code for a prototype page, the markup language code including location indicating code corresponding to the distribution of presentation areas, picture code for first and second pictures corresponding to the first and second icon symbols, respectively, the picture code being combined with the location indicating code, the markup language code further including interaction code corresponding to the navigation symbol, wherein the prototype page is capable of simulating the navigation between the first and second objects in the computer program.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
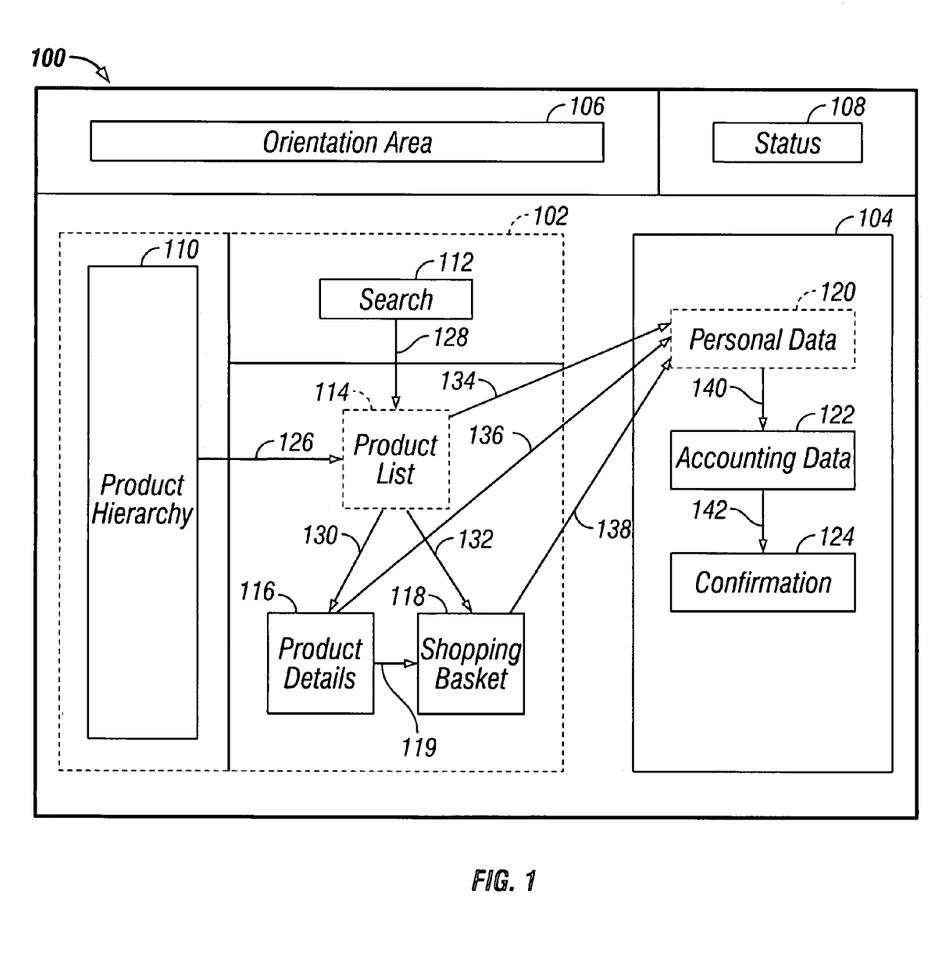
FIG. 1 schematically shows a screen snapshot of a first display in accordance with the invention.

FIG. 1 shows an exemplary display 100 that may appear during a software application designer's interaction with a system according to the invention. The designer may generate the display 100 for the purpose of obtaining a prototype page that is capable of simulating navigation in a computer program. The display 100 currently contains a number of presentation areas. In the largest of the presentation areas, the designer has designated presentation subareas 102 and 104, and has placed a number of icon symbols therein that will be discussed later. In respective presentation areas toward the top of display 100, the designer has placed icon symbols 106 (Orientation Area) and 108 (Status).

Figure 2:
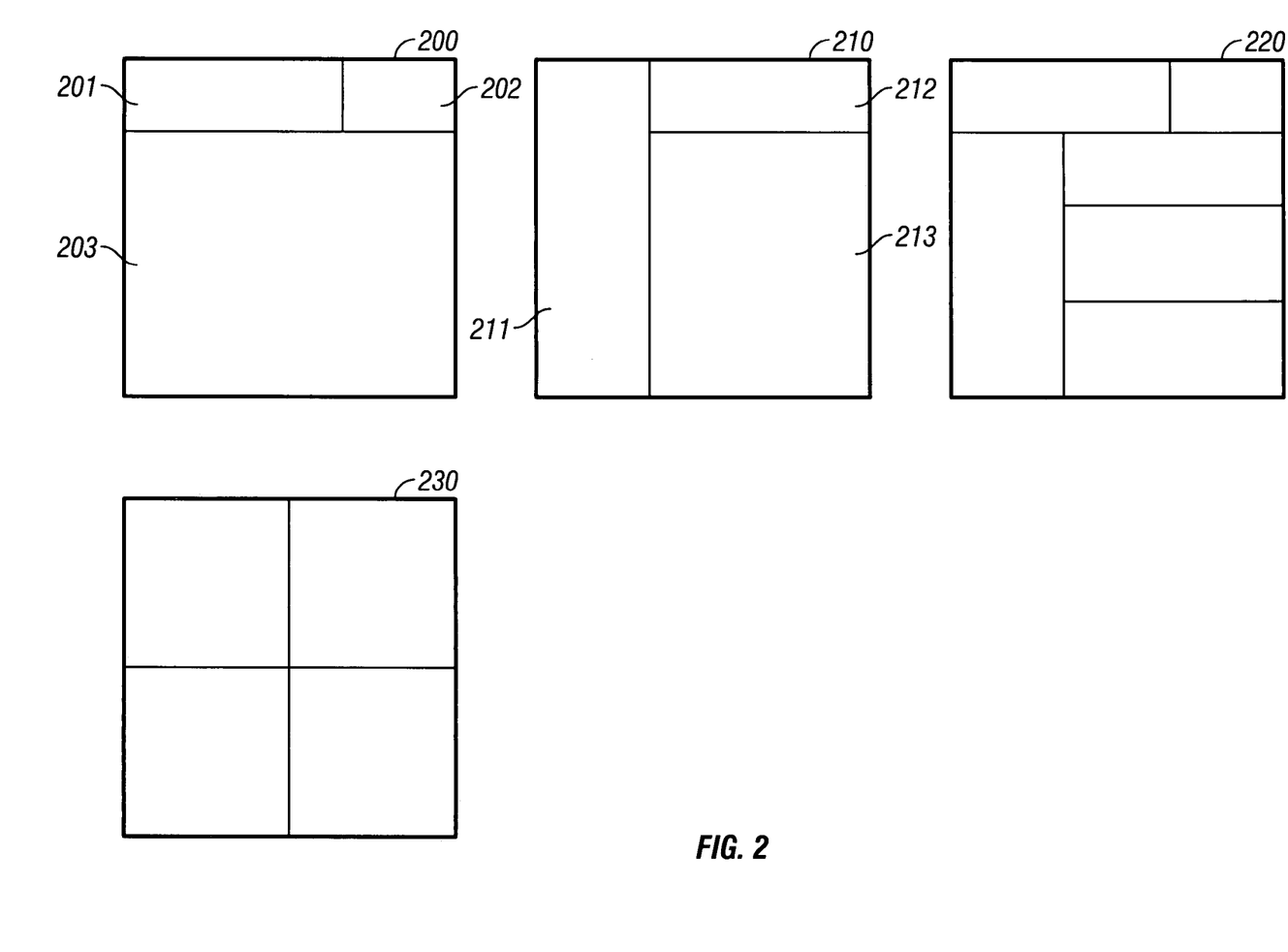
FIG. 2 shows exemplary distributions of presentation areas capable of being used in the display of FIG. 1.

The designer may have begun assembling display 100 by choosing a distribution of presentation areas from a database. FIG. 2 shows four exemplary distributions 200, 210, 220 and 230 of presentation areas. Distribution 200 includes presentation areas 201 and 202 at the top, and a large presentation area 203 at the bottom. This is the distribution that the designer may have used in creating display 100. That is, the designer placed icon symbol 106 in presentation area 201, icon symbol 108 in presentation area 202, and the presentation subareas 102 and 104 in presentation area 203. The designer designated presentation subarea 102 as default, which is indicated by a dashed border. Distributions 220 and 230 have presentation areas distributed in different ways. Other distributions having more or fewer presentation areas may be used.

Presentation areas may be nested within each other. For example, the designer used distribution 210 to designate presentation subarea 102. The distribution 210 includes a tall presentation area 211 on its left side, a presentation area 212 at the top, and a large presentation area 213 at the bottom.

The designer placed icon symbol 110 (Product Hierarchy) in presentation area 211, icon symbol 112 (Search) in presentation area 212, and three icon symbols 114 (Product List), 116 (Product Details) and 118 (Shopping Basket) in presentation area 213. The designer designated the icon symbol 114 as default, which is indicated by a dashed border. In presentation subarea 104, the designer placed three icon symbols 120 (Personal Data), 122 (Accounting Data) and 124 (Confirmation). The designer designated icon symbol 120 as default, which is indicated by a dashed border.

The icon symbols represent objects that are to be included in the computer program. That is, the computer program is intended to have a distribution of presentation areas like that of display 100, and the icon symbols will be used to simulate navigation between the objects. For this purpose, the designer places navigation symbols between the icon symbols. Here, the designer has placed navigation symbol 126 between icon symbols 110 and 114. The icon symbol 126 is an arrow leading from icon symbol 110 to icon symbol 114. This may indicate that a user of the computer program may be able to navigate from the object corresponding to the icon symbol 110 to an object corresponding to the icon symbol 114. This navigation may take place using a link.

Similarly, the designer placed navigation symbol 128 between icon symbol 112 and icon symbol 114; navigation symbols 130 and 132 between icon symbol 114 and icon symbols 116 and 118, respectively; navigation symbol 119 between icon symbols 116 and 118; navigation symbol 134 between icon symbols 114 and 120; navigation symbol 136 between icon symbols 116 and 120; navigation symbol 138 between icon symbols 118 and 120; navigation symbol 140 between icon symbols 120 and 122; and navigation symbol 142 between icon symbols 122 and 124. Thus, navigation symbols can be placed between icon symbols in a common presentation area (such as between icon symbols 114 and 116) or between icon symbols in different presentation areas (such as between icon symbols 114 and 120). More than one navigation symbol may originate in a particular icon symbol, for example the navigation symbols 130 and 132 originating in the icon symbol 114. Also, more than one navigation symbol may lead to a particular icon symbol, for example the navigation symbols 134, 136 and 138 leading to the icon symbol 120.

The information contained in display 100, or at least part thereof, may be used in creating a prototype page capable of simulating navigation between objects in the computer program. For this purpose, markup language code may be provided that a browser can use to display the prototype page. The markup language code will be provided for the particular distribution of presentation areas, for the icon symbols used, and for the navigation symbols placed between the objects. For example, the prototype page will be provided with location indicating code corresponding to the distribution of presentation areas, picture code for pictures corresponding to the icon symbols, and interaction code corresponding to the navigation symbols. A user of the prototype page may observe the pictures created by the picture code, in locations specified by the location indicating code, and navigate between the pictures as specified by the interaction code.

Figure 3:
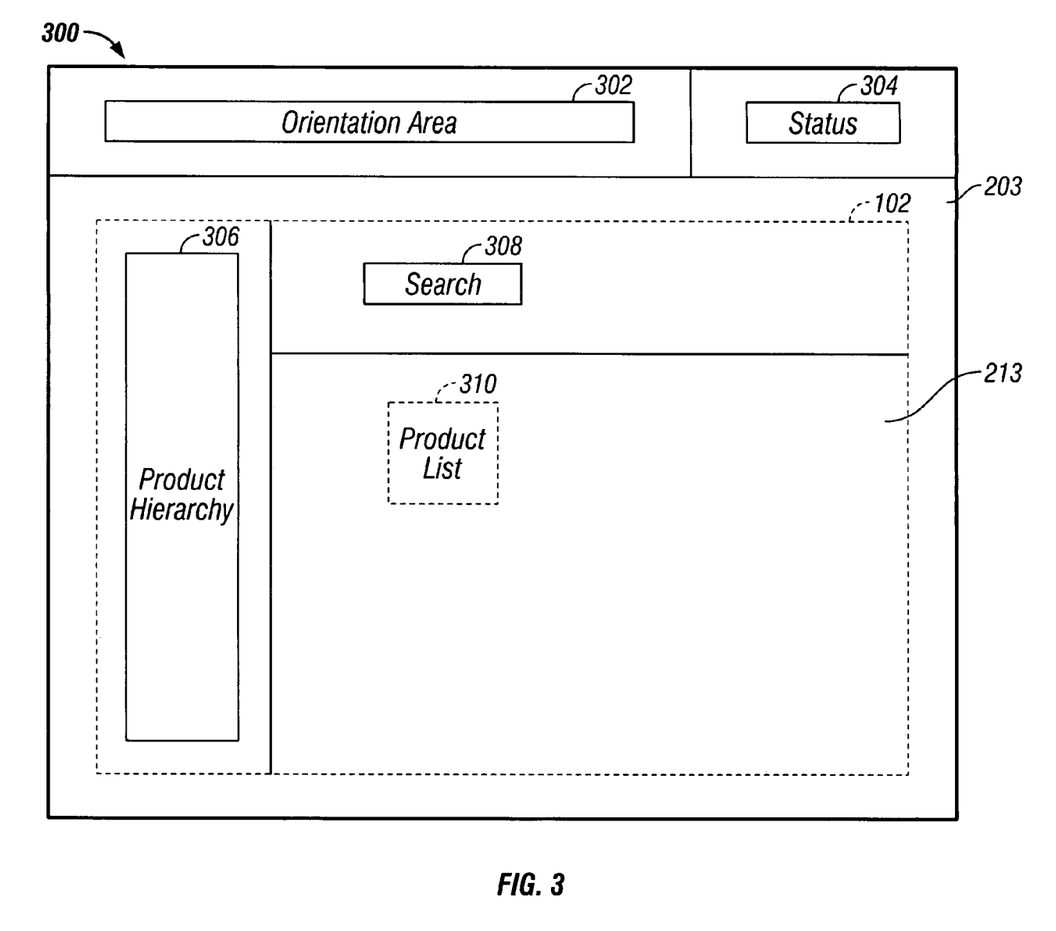
FIGS. 3 and 4 schematically show a first exemplary prototype page corresponding to the display of FIG. 1.

FIG. 3 schematically shows a prototype page 300. The prototype page 300 may comprise location indicating code, picture code and interaction code corresponding to icon symbols. In this example, the prototype page 300 may have been generated from the presentation areas, icon symbols and navigation symbols of display 100. Prototype page displays picture 302 (Orientation Area) at the top. This corresponds to icon symbol 106 in presentation area 201. The prototype page 300 also displays picture 304 (Status), corresponding to icon symbol 108 in presentation area 202. In presentation area 203, the prototype page 300 currently displays pictures corresponding to icon symbols in presentation subarea 102, and does not currently display any picture(s) corresponding to icon symbols in presentation subarea 104. This is because presentation subarea 102 was the default in presentation area 203. The appearance of prototype page 300 will change upon navigation, as will be described below. In FIG. 3, the presentation areas have visible borders. In other implementations, presentation areas in prototype pages may have different visual characteristics or may be invisible.

The prototype page 300 displays picture 306 (Product Hierarchy) in presentation area 211. This corresponds to icon symbol 110. The prototype page displays picture 308 (Search), corresponding to icon symbol 112 in presentation area 212. In presentation area 213, the prototype page 300 currently displays picture 310 (Product List) corresponding to icon symbol 114. This is because icon symbol 114 was the default in presentation area 213. The prototype page 300 does not currently display any picture(s) corresponding to the other icon symbols (116 and 118) in presentation area 213.

Navigation symbol 130 in FIG. 1 indicates that it is possible to navigate between the respective pictures corresponding to icon symbols 114 and 116. This navigation may take place using a link in prototype page 300. For example, the picture 310 may be a link that the user can select using a pointing device. When the link is activated, the prototype page 300 would display a picture (not shown) corresponding to the icon symbol 116. Because the icon symbols 114 and 116 are located in the same presentation area 213, the prototype page 300 ceases to display the picture 310 after this linking.

Linking may also occur from one presentation area to another. For example, navigation symbol 134 indicates a navigation from presentation subarea 102 (icon symbol 114) to presentation subarea 104 (icon symbol 120). Upon this navigation (which may occur by activating picture 310 as a link), the prototype page 300 in FIG. 4 displays picture 400 (Personal Data), corresponding to icon symbol 120 in presentation subarea 104. Because presentation subareas 102 (in which the navigation originated) and 104 are located in the same presentation area 213, the prototype page 300 ceases to display the pictures 306, 308 and 310 in presentation subarea 102 upon the navigation.

Figure 4:
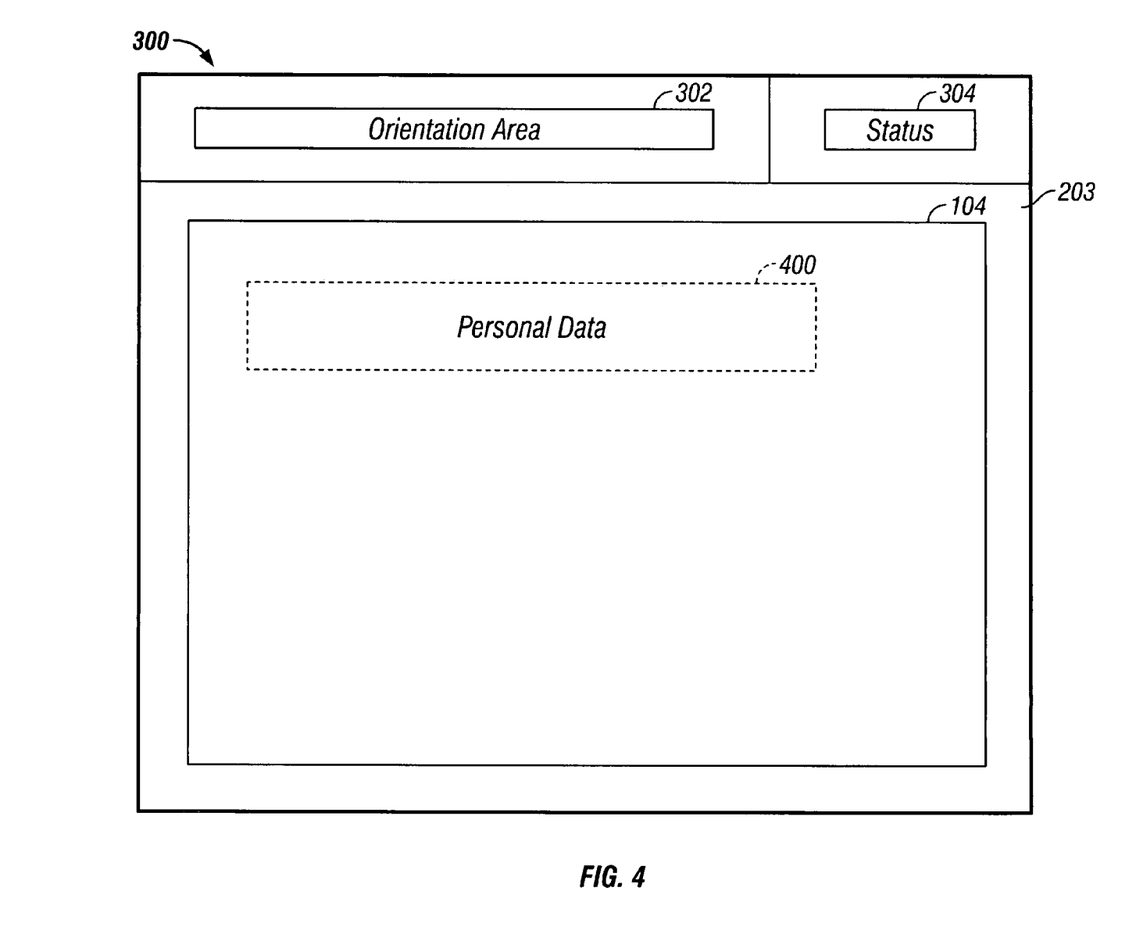

The pictures corresponding to the other icon symbols (122 and 124) in presentation subarea 104 are currently not displayed in prototype page 300. If the user activates a link corresponding to the navigation symbol 140, a picture corresponding to icon symbol 122 would be displayed and the picture 400 would disappear. The same applies to the navigation symbol 142 joining icon symbols 122 and 124.

In this example, the prototype page 300 displays the same pictures 302 and 304 before and after the navigation shown in FIGS. 3 and 4. In other embodiments, one or more of these pictures may be changed as the linking occurs, as will be described in a later example.

Figure 5:
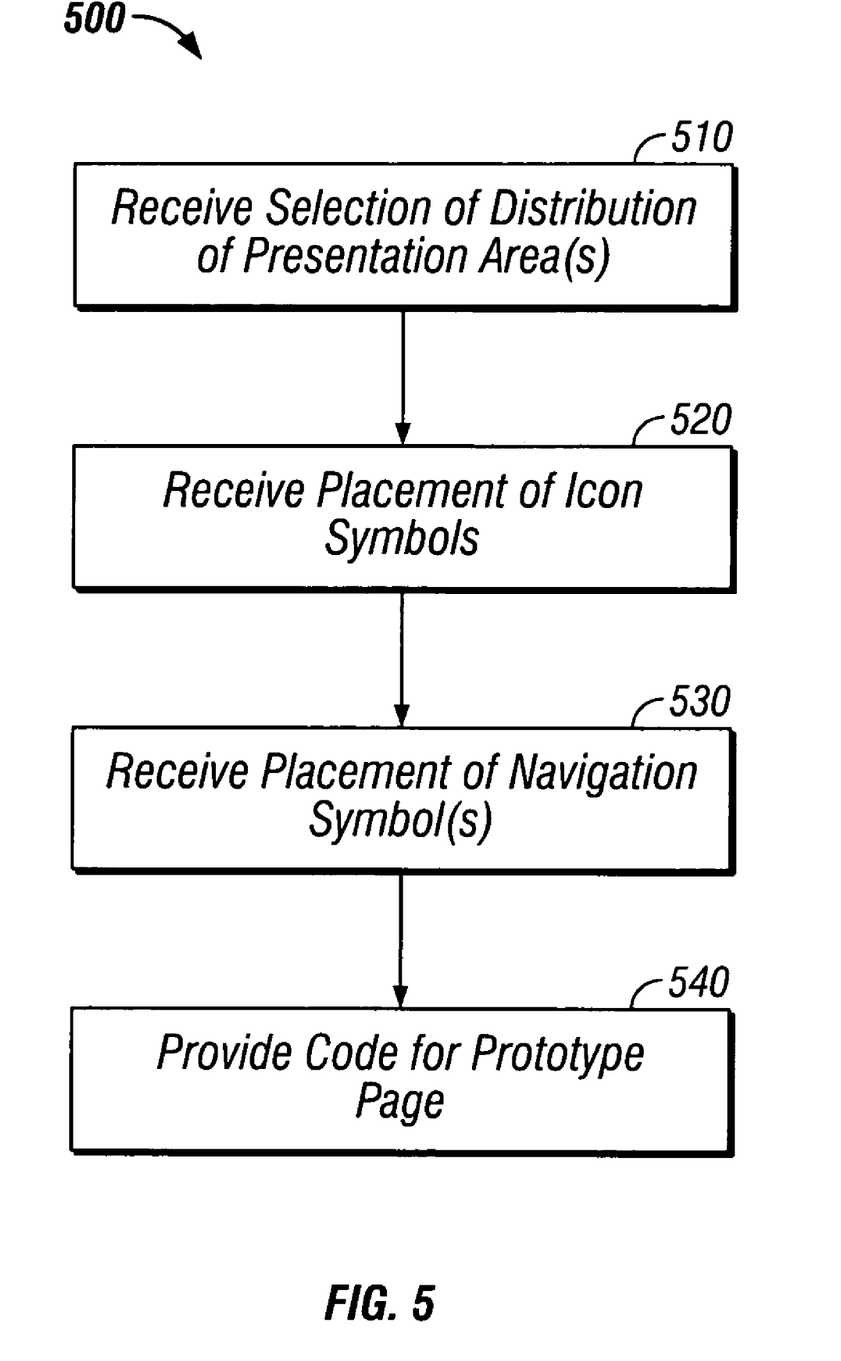
FIG. 5 is an embodiment of a process in accordance with the invention.

FIG. 5 shows a process 500 that may be performed when providing a prototype page, for example when using presentation 100 to generate the prototype page 300 as was described with regard to FIGS. 1-4. First, the designer may choose between distributions of presentation areas, such as the exemplary ones shown in FIG. 2. The available selections may be displayed on a computer screen, and the designer may indicate the selection using a pointer device. The selection of a distribution of presentation areas is received in step 510. The selection may involve more than one distribution if the designer decides to nest one or more presentation areas (subareas) within another presentation area.

The designer may place icon symbols in one or more of the presentation areas. The designer may use a pointing device in placing the icon symbols. The placement of icon symbols is received in step 520.

Similarly, the designer may place one or more navigation symbols between icon symbols. The designer may use a pointing device in placing the icon symbols. The placement of a navigation symbol is received in step 530. It will be apparent from the description of FIGS. 1-4 above that more or fewer icon symbols or navigation symbols may be used.

Generating the prototype page involves providing markup language code based on the information received in steps 510, 520 and 530, and this takes place in step 540. Using the markup language code, the prototype page will be able to simulate navigation between objects in a computer program. An example of the markup code that may be provided will now be described.

Figure 6:
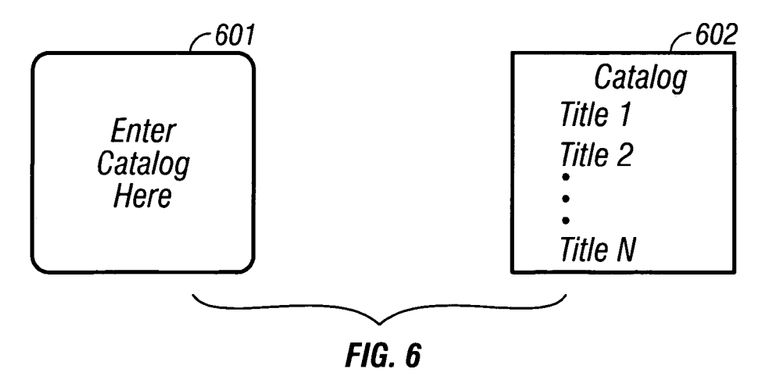
FIG. 6 is pictures for prototype pages.

Suppose that a designer wishes to create a prototype page for a computer program capable of running an online book store. The computer program should include a link where a user can enter a catalog of the books. In accordance with the above description, the designer may assemble a presentation using distributions of presentation areas, icon symbols and navigation symbols. Particularly, there would be an icon symbol from which the user could navigate to the catalog, which would be represented by another icon symbol. FIG. 6 shows exemplary pictures 601 and 602 that may be used in this regard. That is, picture 601 in the prototype page should provide a link to picture 602. This may be accomplished by assigning pictures 601 and 602 to the respective icon symbols, and by defining the link between the pictures.

Figure 7A:
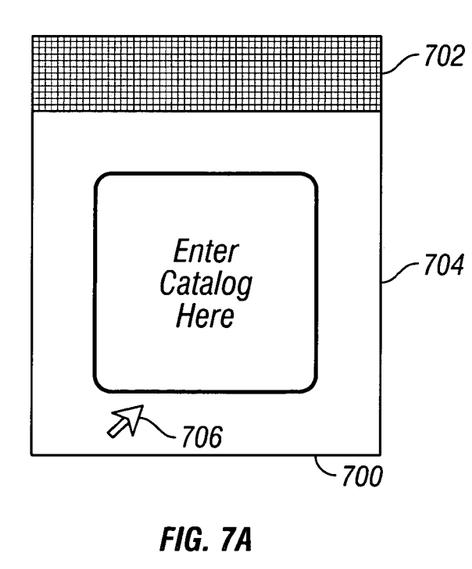
FIGS. 7a-b show an exemplary second prototype page.
Figure 7B:
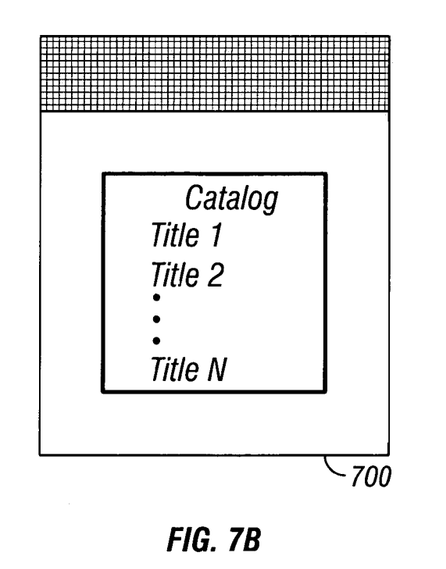

FIG. 7a shows an exemplary prototype page 700 for this purpose. The prototype page 700 has presentation areas 702 and 704 and is currently displaying the picture 601 in the latter. The picture 601 is interactive, and navigation may be initiated using a pointer device, as indicated by an arrow symbol 706. Following navigation, the prototype page 700 may display picture 602 as shown in FIG. 7b. The following table shows exemplary suitable hypertext markup language (HTML) code that may provide the suitable code in prototype page 700.

TABLE 1

| Code in Prototype Page | HTML Example |
|---|---|
| Distribution of Presentation Areas | <frameset rows="20%,80%"> |
| | <frame src="702.htm"> |
| | <frame src="704.htm"> |
| Code For Area 702 | <body bgcolor=#90ee90> |
| Code For Area 704 | <A HREF="TITLE SELECTION.jpg"> |
| Picture Code | <img src="ENTER CATALOG.jpg"> |
| Interaction Code | </A> |

The code for presentation areas 702 and 704 may be included in the files 702.htm and 704.htm, respectively. Thus, markup language code such as that exemplified in Table 1 may be used to provide the prototype page. Preferably, code is provided in a language that is hyper text markup language (HTML), extensible markup language (XML), extensible hyper text markup language (XHTML), wireless application markup language (WML), and Standard Generalized Markup Language (SGML), Java, JavaScript or a any combination thereof. Conveniently, the code may initially be provided in XML and subsequently converted into HTML.

The corresponding markup language code is associated with the respective icon symbols. Thereby, markup language code for the prototype page can be generated from the icon symbols and navigation symbols. The associations between markup language code and icon symbols may be stored as predefined symbol-to-code conversion rules.

The location indicating code corresponds to the distribution of presentation areas, for example by using framesets for areas 702 and 704. The 20/80 percent division is exemplary and could be determined in the step 510 shown in FIG. 5.

The picture code is, for example, the identification of picture files (e.g., *.jpg, *.gif) that represent the icon symbols. Picture code is combined with location code, in the example, by including the code into frame "704.htm".

Interaction code provides navigation between pictures 601 and 602. In the example, picture 601 is the hyperlink to picture 602. The frames may optionally have different appearances, such as color coding.

A generated prototype page, such as the prototype page 700 just described, may be used when the computer program is created. More specifically, the prototype page may be used in creating one or more pages for the computer program that are capable of exhibiting the navigation features simulated by the prototype page. The markup code for the distribution of presentation areas and for the navigation may be used at runtime, that is, in the computer program. User interface elements should be defined for each icon symbol and a screen painter application may be used for this purpose. A data model should be implemented and the user interface elements be bound to objects in the data model as is conventional. An event handler should be implemented for the events associated with the user interface elements. The navigation can then be triggered by the event handler implementation. In analogy with the term prototype page for the simulation of navigation features, the resulting page of the computer program may be referred to as a use page. On the use page, the user can navigate between objects as simulated by the prototype page.

Figure 8:
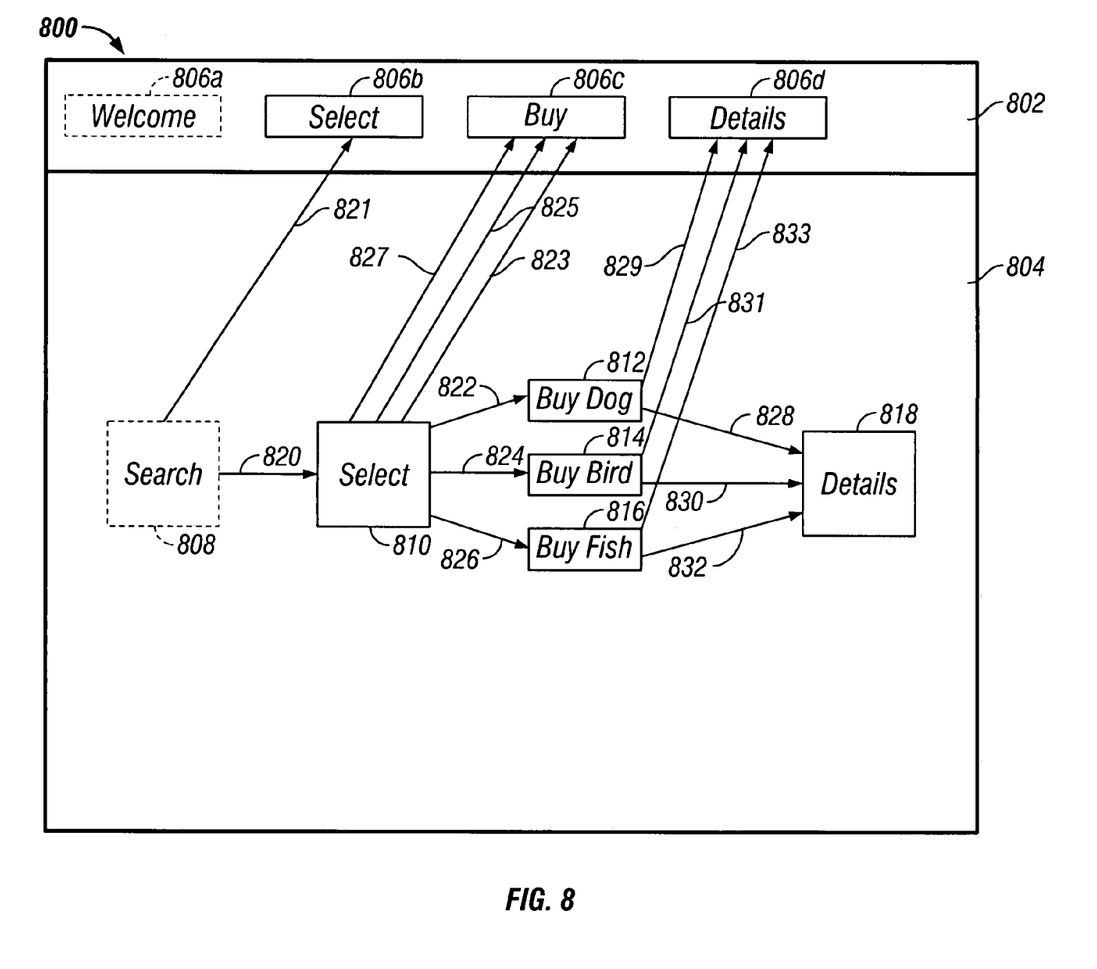
FIG. 8 schematically shows a screen snapshot of a second display in accordance with the invention.

Another example of providing a prototype page will now be described with reference to FIGS. 8 and 9. The prototype page may be used in testing a computer program to be used as an on-line shop such as a bookstore. A designer may create a presentation 800 along the lines as described above with reference to FIGS. 1 and 2. That is, the designer may select a distribution of presentation areas from a database, and in this example the selected distribution includes presentation area 802 towards the top of the display and a larger presentation are 804 towards the bottom. In the presentation area 802 the designer has placed icon symbols 806*a-d*, for example corresponding to messages that will be displayed when the resulting computer program is operated. The designer has designated the icon symbol 806*a* to be default.

In presentation area 804 the designer has placed six icon symbols 808 (Search), 810 (Select), 812 (Buy Dog), 814 (Buy Bird), 816 (Buy Fish) and 818 (Details). The designer has designated the icon symbol 808 to be default, and has placed navigation symbol 820 between it and the icon symbol 810. The designer has placed navigation symbol 821 such that it leads from the icon symbol 808 to the icon symbol 806*b*. The navigation symbols 820 and 821 have the same point of origin, which indicates that the simulated navigation will include both changing the picture displayed in presentation area 804 (navigation symbol 820), and changing the picture displayed in the presentation area 802 (navigation symbol 821). Navigation symbol 822 leads from icon symbol 810 to icon symbol 812, and navigation symbol 823 leads from icon symbol 810 to icon symbol 806*c*. Thus, this simulated navigation will include changing the pictures displayed in the presentation area 804 (navigation symbol 822) and in presentation area 802 (navigation symbol 823). Similarly, navigation symbols 824 and 825 lead from icon symbol 810 to icon symbols 814 and 806*c*, respectively. And navigation symbols 826 and 827 lead from icon symbol 810 to icon symbols 816 and 806*c*, respectively. In an analogous way, the following navigation symbols lead from the respective Buy icon symbols (812, 814 and 816): navigation symbols 828 and 829; 830 and 831; and 832 and 833.

Figure 9A:
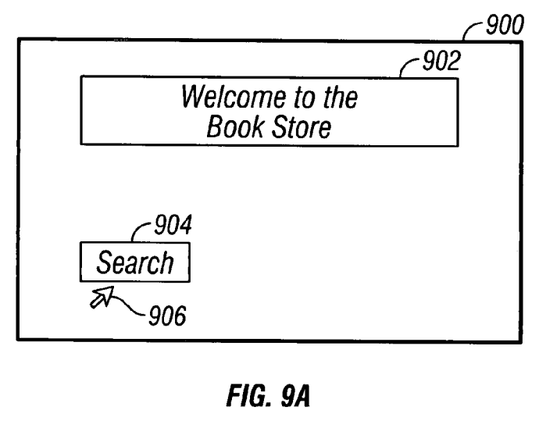
FIGS. 9a-d schematically show an exemplary third prototype page corresponding to the display of FIG. 8.

FIG. 9*a* shows an example of a prototype page 900 that may be generated from the presentation 800. The prototype page 900 includes a picture 902 displaying a message to a user entering the online bookstore. The picture 902 corresponds to the icon symbol 806*a* in presentation area 802, which was designated as default. The prototype page 900 also includes a picture 904, which corresponds to the icon symbol 808 in presentation area 804, which the designer had chosen as the default. Accordingly, the prototype page 900 does not currently display any picture(s) corresponding to the other icon symbols (810, 812, 814, 816 and 818) in presentation area 804. Nor does the prototype page 900 display any picture(s) corresponding to the other icon symbols (806*b-d*) in presentation area 802. The picture 904 includes a link that the user may activate using a pointer device, as indicated by cursor 906. Activating the link corresponds to the navigation represented by the navigation symbols 820 and 821.

Figure 9B:
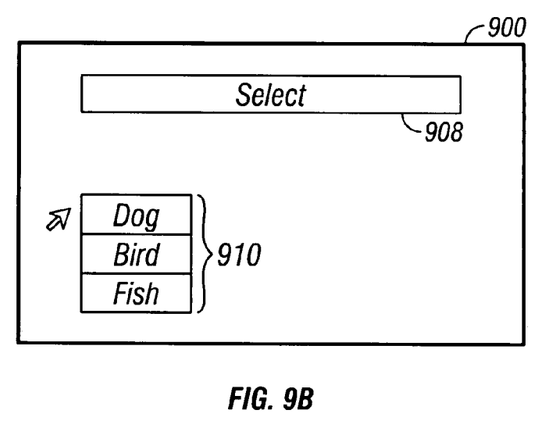

FIG. 9*b* shows the prototype page 900 after the navigation. A message picture 908 (corresponding to icon symbol 806*b*) is now displayed in presentation area 802, and presentation area 804 contains a picture 910, that the user can activate using the pointer device. Because the icon symbols 808 and 810 were placed in the same presentation area 804, the prototype page 900 displays only the picture 910 corresponding to the icon symbol 810 after the navigation, and not the search picture 904 corresponding to icon symbol 808. Similarly, after the navigation, the prototype page 900 displays the picture 908 and not the picture 902. In this example, the picture 910 comprises a selection between three items: exemplary books entitled Dog, Bird and Fish, respectively. A user may select one of the items using the pointer device, thereby activating a link. This corresponds to the navigation represented by one of the navigation symbols 822 and 823; 824 and 825; and 826 and 827.

Figure 9C:
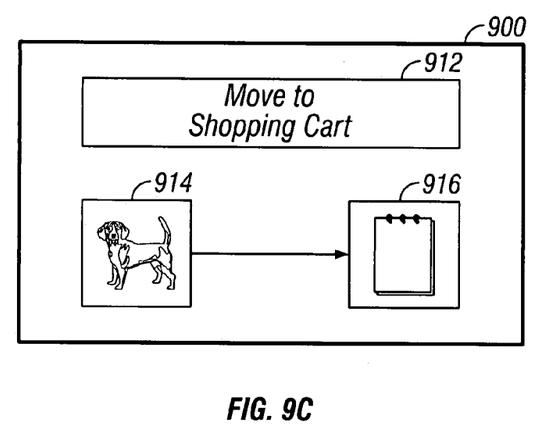

FIG. 9*c* shows the appearance of prototype page 900 after a user selects the Dog title in FIG. 9*b*. The navigation corresponds to navigation symbols 822 and 823. Picture 912 corresponds to icon symbol 806*c* and indicates that the selected book can be moved to the shopping cart. The selected book from FIG. 9*b* is shown as picture 914. A picture 916 indicates that the user can place the item 914 in the shopping cart. In this example, the user may select the item 914 using the pointer device, drag it to the picture 916, and release. This action may trigger the linking that corresponds to the navigation symbols 828 and 829 in FIG. 8.

Figure 9D:
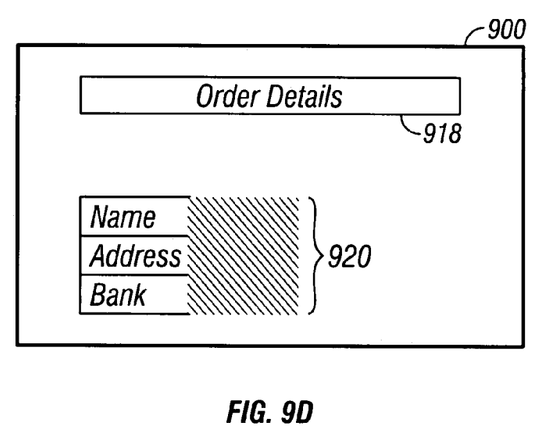

In FIG. 9*d*, the prototype page 900 displays the order details in correspondence with the icon symbol 818. The picture 918 at the top of the prototype page 900 corresponds to icon symbol 806*d* and displays "order details". The area 804 has been updated to show order details 920. For example, the order details 920 may provide fields indicating where the user should enter details such as name, address and bank information.

Accordingly, the icon symbols and navigation symbols selected by the designer in FIG. 8 can be used to provide markup language code for a prototype page that is capable of executing the sequence of linking described with reference to FIGS. 9*a-d*. Other examples of icon symbols, navigation symbols and prototype pages are possible.

Figure 10:
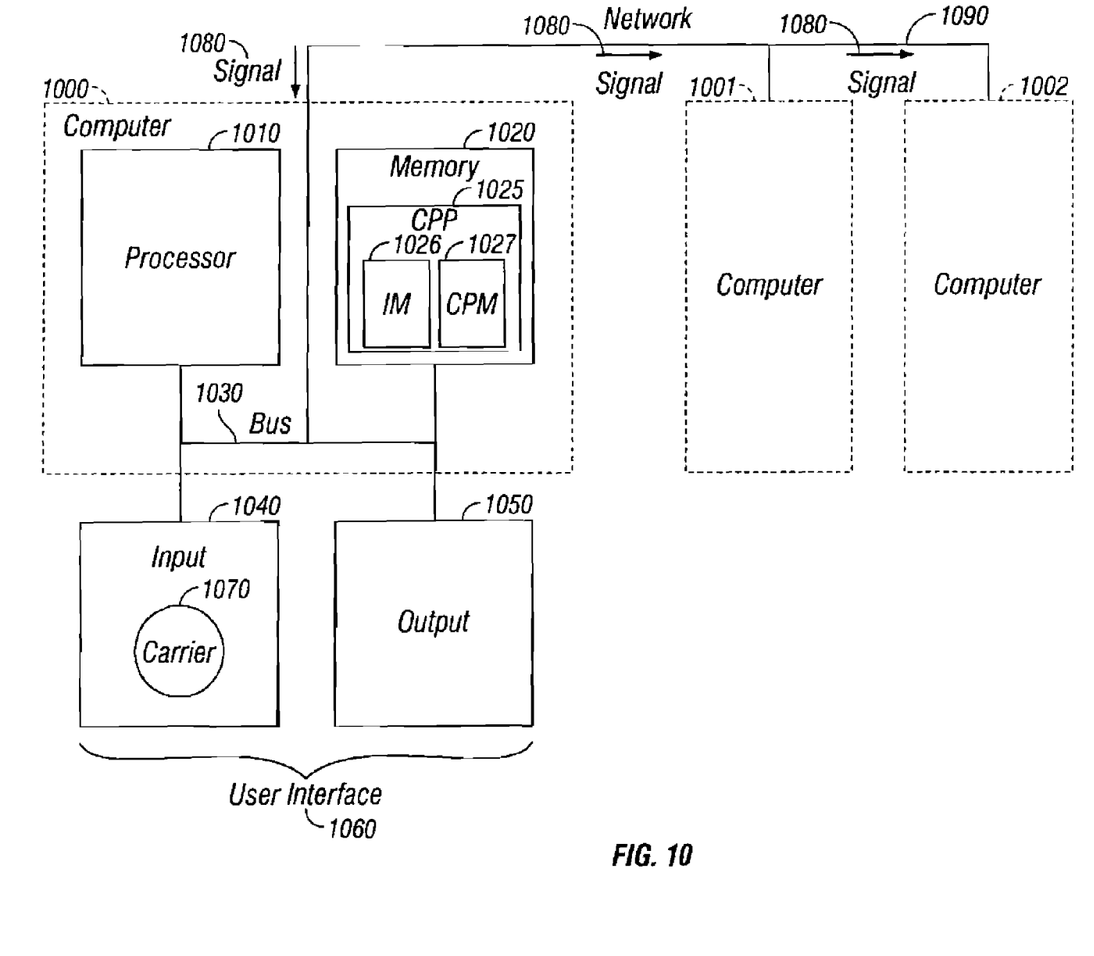
FIGS. 10 and 11 are block diagrams of computer systems embodying the invention.

Inventive methods may be performed by computer systems having appropriate software. FIG. 10 is a block diagram of an exemplary computer system. The system may comprise a plurality of computers 1000, 1001, 1002, and so on. The computers 1000-1002 are coupled via inter-computer network 1090. Computer 1000 comprises processor 1010, memory 1020, bus 1030, and, optionally, input device 1040 and output device 1050. These input/output devices are collectively referred to as user interface 1060. The system may comprise an inventive computer program product (CPP) 1025, program carrier 1070 and program signal 1080. Any or all of these may be referred to as the "program".

With respect to computer 1000, any of computers 1001 and 1002 is sometimes referred to as a "remote computer". Any of computers 1001 and 1002 may, for example, be a server, a router, a peer device or other common network node, and typically comprises many or all of the elements described relative to computer 1000. Hence, elements 1010-1080 in computer 1000 may also illustrate corresponding elements in computers 1001, 1002, etc.

Computer 1000 may, for example, be a conventional personal computer (PC), a desktop or hand-held device, a multiprocessor computer, a pen computer, a microprocessor-based or programmable consumer electronics, a minicomputer, a mainframe computer, a personal mobile computing device, a mobile phone, a portable or stationary personal computer, a palmtop computer or the like. Processor 1010 may, for example, be a central processing unit (CPU), a micro-controller unit (MCU), digital signal processor (DSP), or the like.

Memory 1020 symbolizes elements that temporarily or permanently store data and instructions. Although memory 1020 is conveniently illustrated as part of computer 1000, memory function can also be implemented in network 1090, in computers 1001 or 1002, and in processor 1010 itself (e.g., cache, register), or elsewhere. Memory 1020 can be a read-only memory (ROM), a random access memory (RAM), or a memory with other access options. Memory 1020 may be physically implemented by computer-readable media, such as, for example: (a) magnetic media, like a hard disk, a floppy disk, or other magnetic disk, a tape, a cassette tape; (b) optical media, like an optical disk (CD-ROM, digital versatile disk—DVD); (c) semiconductor media, like DRAM, SRAM, EPROM, EEPROM, memory stick, or by any other media, Optionally, memory 1020 is distributed across different media. Portions of memory 1020 may be removable or non-removable. For reading from media and for writing in media, computer 1000 may use devices well known in the art such as disk drives and tape drives.

Memory 1020 may store support modules such as, for example, a basic input output system (BIOS), an operating system (OS), a program library, a compiler, an interpreter, and a text-processing tool. Support modules are commercially available and can be installed on computer 1000 by those of skill in the art. For simplicity, these modules are not illustrated.

CPP 1025 comprises program instructions and—optionally—data that causes processor 1010 to execute method steps of the present invention. Particularly, CPP may include an Interaction Module (IM) 1026 and a Code-Providing Module (CPM) 1027. IM 1026 and CPM 1027 may be implemented by program instructions executable by processor 1010. When so executed, IM 1026 may receive a selection of a distribution of presentation areas to be used in a computer program. IM 1026 may receive a placement of first and second icon symbols in at least one of the presentation areas, the first and second icon symbols representing first and second objects, respectively, of the computer program. IM 1026 may receive a placement of a navigation symbol that graphically links the first and second icon symbols, the navigation symbol representing a navigation between the first and second objects in the computer program.

CPM 1027 may provide markup language code for a prototype page. The markup language code includes location indicating code corresponding to the distribution of presentation areas. The markup language code includes picture code for first and second pictures corresponding to the first and second icon symbols, respectively, the picture code being combined with the location indicating code. The markup language code further includes interaction code corresponding to the navigation symbol for presenting the first picture prior to the second picture, wherein the prototype page is capable of simulating the navigation between the first and second objects in the computer program.

Thus, CPP 1025 may define the operation of computer 1000 and its interaction in the system. For example and without the intention to be limiting, CPP 1025 can be available as source code in any programming language, and as object code ("binary code") in a compiled form. Persons of skill in the art can use CPP 1025 in connection with any of the above support modules (e.g., compiler, interpreter, operating system). Although CPP 1025 is illustrated as being stored in memory 1020, CPP 1025 can be located elsewhere. CPP 1025 can also be embodied in carrier 1070.

Carrier 1070 is illustrated outside computer 1000 in FIG. 10. For communicating the CPP 1025 to the computer 1000, the carrier 1070 may conveniently be inserted into input device 1040. Carrier 1070 may be implemented as any computer readable medium, such as a medium explained above (cf. memory 1020). Generally, the carrier 1070 may be an article of manufacture comprising a computer readable medium having computer readable program code embodied therein for executing the method of the present invention. Signal 1080 travels on network 1090 to computer 1000.

The CPP 1025, program carrier 1070, and program signal 1080 were described in connection with the computer 1000 for convenience. Optionally, processors in computers 1001 and 1002 may execute instructions in corresponding products, signals and carriers.

Input device 1040 symbolizes a device that provides data and instructions for processing by the computer 1000. For example, device 1040 may be a device that operates based on human interaction, such as a keyboard, a pointing device (e.g., mouse, trackball, cursor direction keys), microphone, joystick, game pad, scanner or a disk drive. Input device 1040 may also be a device operating without human interaction, such as a wireless receiver (e.g., with satellite dish or terrestrial antenna), a sensor (e.g., a thermometer), a counter (e.g., goods counter in a factory). Input device 1040 may read carrier 1070.

Output device 1050 symbolizes a device that presents instructions and data that have been processed. For example, device 1050 may be a monitor or a display, (cathode ray tube (CRT), flat panel display, liquid crystal display (LCD), speaker, printer, plotter, vibration alert device. Output device 1050 communicates with the user, and may also communicate with other computers. Input device 1040 and output device 1050 are optional and may be combined to a single device.

Bus 1030 and network 1090 provide logical and physical connections by conveying instruction and data signals. While connections inside computer 1000 are conveniently referred to as "bus 1030", connections between computers 1000-1002 are referred to as "network 1090". Optionally, network 1090 may comprise gateways that are computers specializing in data transmission and protocol conversion.

Devices 1040 and 1050 may be coupled to computer 1000 by bus 1030 (as illustrated in FIG. 10) or optionally by network 1090. While the signals inside computer 1000 are mostly electrical signals, the signals in network may be electrical, magnetic, optical or wireless (radio) signals.

Networking environments (such as network 1090) are commonplace in offices, enterprise-wide computer networks, intranets and the internet (i.e. world wide web). The physical distance between a remote computer and computer 1000 is not important. Network 1090 can be a wired or a wireless network. To name a few network implementations, network 1090 may, for example, be a local area network (LAN), a wide area network (WAN), a public switched telephone network (PSTN); a Integrated Services Digital Network (ISDN), an infra-red (IR) link, a radio link, like Universal Mobile Telecommunications System (UMTS), Global System for Mobile Communication (GSM), Code Division Multiple Access (CDMA), or satellite link.

Known transmission protocols and data formats may be used, such as transmission control protocol/internet protocol (TCP/IP), hyper text transfer protocol (HTTP), secure HTTP, wireless application protocol, unique resource locator (URL), a unique resource identifier (URI), hyper text markup language HTML, extensible markup language (XML), extensible hyper text markup language (XHTML), wireless application markup language (WML), Standard Generalized Markup Language (SGML) etc.

Interfaces coupled between the elements are also well known in the art. For simplicity, interfaces are not illustrated. An interface may, for example, be a serial port interface, a parallel port interface, a game port, a universal serial bus (USB) interface, an internal or external modem, a video adapter, or a sound card.

Computers and programs are closely related. As used herein, phrases such as "provide" or forms thereof, are convenient abbreviations to express actions by a computer that is controlled by a program.

Figure 11:
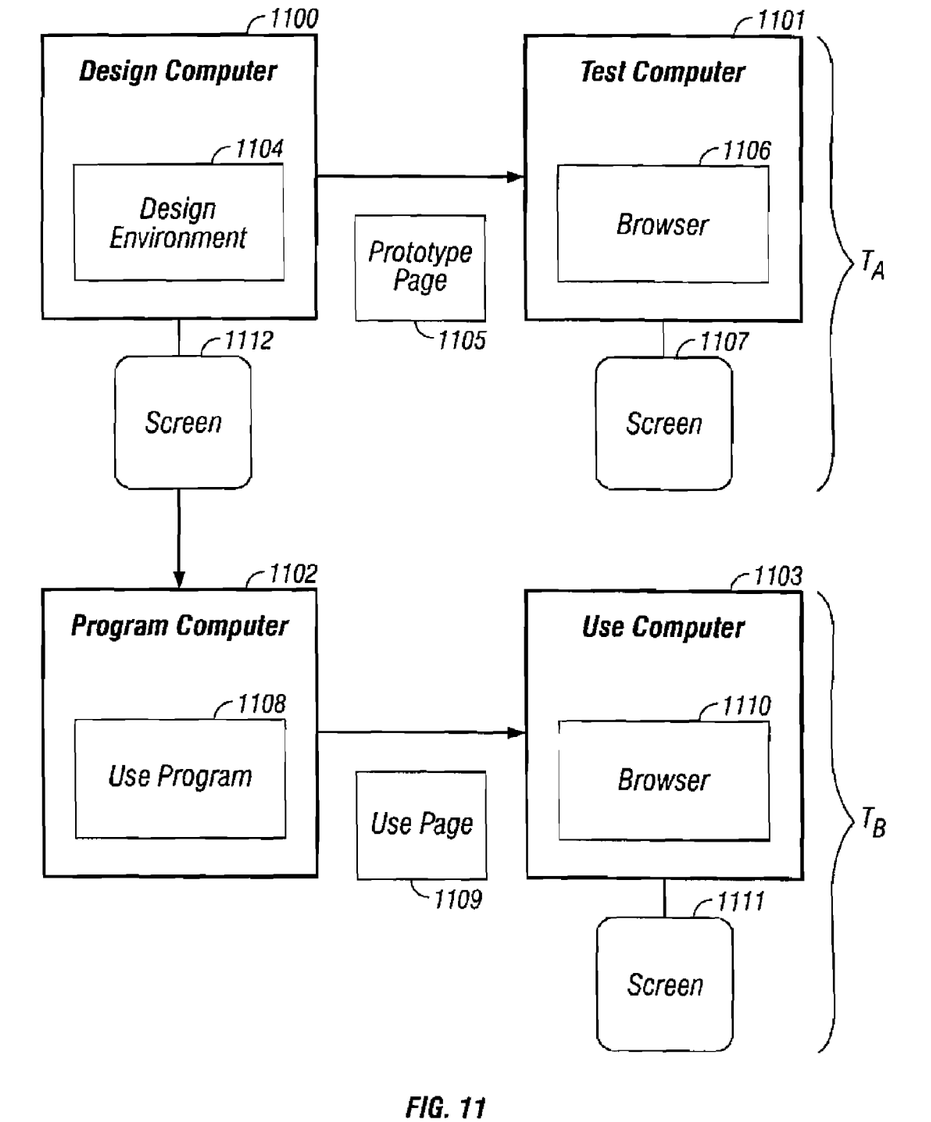

It has been described that prototype pages may be used for simulating (or testing) computer programs. The testing may be performed on the same, or a different, computer where the designer assembled the presentation upon which the prototype page is based. As an example, FIG. 11 shows a system of four computers 1100, 1101, 1102 and 1103 that can be used for designing, testing, programming and using the resulting computer program, respectively. A designer of the computer program may use the design computer 1100. A testing person may use the test computer 1101. The program computer 1102 may be in automatic operation. Any person(s) operating the use computer 1103 is simply referred to as user(s).

In this example, the design computer 1100 and test computer 1101 are shown as being operated during design and prototype-test time $T_A$. The program computer 1102 and use computer 1103 are shown as being operated during program and use time $T_B$.

The computers 1100-1103 comprise computer programs for controlling operation of their respective processors. The processors may also be controlled by code in prototype pages and use pages. In this example, design computer 1100 comprises a design environment 1104. The design environment 1104 may include the CPP 1025 and, particularly, IM 1026 and CPM 1027. The designer may interact with the design environment 1104 to provide a prototype page 1105 according to the present invention and to forward page 1105 to computer 1101 during time $T_A$. A browser 1106 on test computer 1101 may interpret the prototype page 1105 and interact with the tester, for example via keyboard or mouse, to display the prototype page 1105 on a screen 1107 coupled to test computer 1101. The design environment 1104 may also forward use program 1108 to the program computer 1102 prior to time $T_B$. The use program 1108 may provide use page 1109 in cooperation with an application and database. A browser 1110 on use computer 1003 may interpret use page 1109 and interact with the user to display the use page 1109 on a screen 1111 coupled to the use computer 1103. Browsers 1106 and 1110 may be commercially available browsers.

The design computer 1000 may display on screen 1112 a distribution of presentation areas, icon symbols and navigation symbols, such as shown in FIG. 1. The presentations on test computer 901 are controlled by prototype page 1105 and the presentations on use computer 1103 are controlled by use page 1109. The computers 1101 and 1103 may request page updates from the computers 1100 and 1102, respectively. Requesting is well-known in the art and useful, for example, to search in an application database (catalog). The term "page" is collectively used for page updates and pages that are linked to the original page.

The computers are illustrated as separate units with different functions, but the present invention can be implemented by a different number of computers. For example, design computer 1100 and test computer 1101 can be physically the same machine. While interpreting use page 1109, use computer 1103 is the client of program computer 1102. While the test computer 1101 interprets prototype page 1105, it is optionally the client of design computer 1100. During testing, the client/server relation of computers 1101 and 1100 is not required, and stand-alone testing on computer 1101 is convenient.

A number of embodiments of the invention have been described. Nevertheless, it will be understood that various modifications may be made without departing from the spirit and scope of the invention. Accordingly, other embodiments are within the scope of the following claims.

What is claimed is:

1. Method of providing a prototype page capable of simulating navigation between objects in a computer program, the method comprising:

receiving a selection of a distribution of presentation areas to be used in a computer program, the distribution comprising a layout configured to be used in building versions of a prototype page for simulating successive navigations;

receiving a placement of first and second icon symbols in at least one of the presentation areas, the first and second icon symbols representing first and second objects, respectively, of the computer program, the first and second icon symbols corresponding to respective first and second pictures to be displayed in the at least one of the presentation areas;

receiving a placement of a navigation symbol that graphically links the first and second icon symbols, the navigation symbol representing a simulation of a navigation between the first and second objects in the computer program in which a first version of the prototype page includes the first picture and not the second picture, the first picture comprising a navigation link for causing a second version of the prototype page to be presented in which the second picture is added; and providing markup language code for the prototype page, the markup language code including location indicating code corresponding to the distribution of presentation areas, picture code for the first and second pictures, the picture code being combined with the location indicating code, the markup language code further including interaction code corresponding to the navigation symbol, wherein the prototype page is capable of simulating the navigation between the first and second objects in the computer program.

2. The method of claim 1, further comprising using the prototype page in generating the computer program.

3. The method of claim 1, wherein the distribution of the presentation areas, the placement of the first and second icon symbols, and the placement of the navigation symbol are received from a designer.

4. The method of claim 1, further comprising presenting graphical symbols of predefined area divisions for a designer to select the distribution of the presentation areas.

5. The method of claim 1, wherein the first and second icon symbols are placed in a common presentation area, further comprising receiving input selecting the first icon symbol as default, wherein the prototype page initially displays the first picture in the common presentation area and does not display the second picture.

6. The method of claim 5, wherein the interaction code comprises a link from the first picture to the second picture such that when the link is activated, the second picture is displayed in the common presentation area and the first picture ceases to be displayed in the common presentation area.

7. The method of claim 1, wherein part of one of the presentation areas comprises a first presentation subarea where icon symbols can be placed.

8. The method of claim 7, wherein the second icon symbol is placed in the first presentation subarea, further comprising receiving a placement of a third icon symbol in the first presentation subarea, the third icon symbol representing a third object of the computer program, wherein the prototype page includes picture code for a third picture corresponding to the third icon symbol.

9. The method of claim 8, wherein the first presentation subarea and the first icon symbol are placed in different presentation areas, further comprising receiving input selecting the second icon symbol as default, wherein the prototype page initially displays the first and second pictures and does not display the third picture.

10. The method of claim 8, wherein the first presentation subarea and the first icon symbol are placed in a common presentation area, further comprising receiving input selecting the first and second icon symbols as default, wherein the prototype page initially displays the first picture and does not display the second and third picture.

11. The method of claim 10, wherein the interaction code comprises a link from the first picture to the second picture such that when the link is activated, the second picture is displayed in the first presentation subarea and the first picture ceases to be displayed.

12. The method of claim 7, wherein the first icon symbol is placed in the first presentation subarea and wherein the second icon symbol and the first presentation subarea are placed in a common presentation area, further comprising receiving input selecting the first presentation subarea as default, wherein the prototype page initially displays the first picture and does not display the second picture.

13. The method of claim 7, wherein part of the first presentation subarea comprises a second presentation subarea where icon symbols can be placed.

14. The method of claim 1, further comprising presenting the presentation areas with area borders for a designer to select the distribution of the presentation areas.

15. The method of claim 1, wherein the first icon symbol represents interactive user activities, and wherein the navigation symbol points from the first symbol toward the second icon symbol.

16. The method of claim 15, wherein the navigation symbol is an arrow with its origin at the first icon symbol.

17. The method of claim 1, wherein providing the markup language code comprises using a language selected from the group consisting of hypertext markup language (HTML), extensible markup language (XML), extensible hypertext markup language (XHTML), wireless application markup language (WML), Standard Generalized Markup Language (SGML), Java, and JavaScript.

18. The method of claim 17, wherein providing the markup language code comprises providing the code in XML and subsequently converting the code to HTML.

19. The method of claim 1, wherein providing the markup language code is done according to predefined symbol-to-code conversion rules.

20. The method of claim 1, wherein the second icon symbol is located in a plurality of presentation areas nested within each other, and wherein the interaction code provides that when the simulated navigation between the first and second objects occurs, the prototype page will display the second picture and those of the plurality of presentation areas that are not already displayed.

21. Computer software, tangibly embodied in a computer-readable medium, for providing a prototype page capable of simulating navigation between objects in a computer program, the software comprising instructions to perform operations comprising:

receive a selection of a distribution of presentation areas to be used in a computer program, the distribution comprising a layout configured to be used in building versions of a prototype page for simulating successive navigations;

receive a placement of first and second icon symbols in at least one of the presentation areas, the first and second icon symbols representing first and second objects, respectively, of the computer program, the first and second icon symbols corresponding to respective first and second pictures to be displayed in the at least one of the presentation areas;

receive a placement of a navigation symbol that graphically links the first and second icon symbols, the navigation symbol representing a simulation of a navigation between the first and second objects in the computer program in which a first version of the prototype page includes the first picture and not the second picture, the first picture comprising a navigation link for causing a second version of the prototype page to be presented in which the second picture is added; and provide markup language code for the prototype page, the markup language code including location indicating code corresponding to the distribution of presentation areas, picture code for the first and second pictures, the picture code being combined with the location indicating code, the markup language code further including interaction code corresponding to the navigation symbol, wherein the prototype page is capable of simulating the navigation between the first and second objects in the computer program.

22. The computer software of claim 21, further comprising:
    present graphical symbols of predefined area divisions for the designer to select the distribution of presentation areas.

23. The computer software of claim 21, further comprising:
    present the presentation areas with area borders.

24. The computer software of claim 21, further comprising:
    provide the markup language code in extensible markup language and subsequently convert the markup language code to hypertext markup language.

25. Computer software, tangibly embodied in a computer-readable medium, for providing a prototype page capable of simulating navigation between objects in a computer program, the computer-readable medium comprising:
    program instructions comprising an interaction module that, when executed by a processor, receives a selection of a distribution of presentation areas to be used in a computer program, the distribution comprising a layout configured to be used in building versions of a prototype page for simulating successive navigations, receives a placement of first and second icon symbols in at least one of the presentation areas, the first and second icon symbols representing first and second objects, respectively, of the computer program, the first and second icon symbols corresponding to respective first and second pictures to be displayed in the at least one of the presentation areas, and that receives a placement of a navigation symbol that graphically links the first and second icon symbols, the navigation symbol representing a simulation of a navigation between the first and second objects in the computer program in which a first version of the prototype page includes the first picture and not the second picture, the first picture comprising a navigation link for causing a second version of the prototype page to be presented in which the second picture is added; and
    program instructions comprising a code providing module that, when executed by a processor, provides markup language code for the prototype page, the markup language code including location indicating code corresponding to the distribution of presentation areas, picture code for the first and second pictures, the picture code being combined with the location indicating code, the markup language code further including interaction code corresponding to the navigation symbol, wherein the prototype page is capable of simulating the navigation between the first and second objects in the computer program.

26. The computer-readable medium of claim 25, wherein the interaction module presents graphical symbols of predefined area divisions for a designer to select the distribution of the presentations areas.

27. The computer-readable medium of claim 25, wherein the first and second icon symbols are placed in a common presentation area, further comprising receiving input selecting the first icon symbol as default, wherein the prototype page initially displays the first picture in the common presentation area and does not display the second picture.

28. The computer-readable medium of claim 25, wherein part of one of the presentation areas comprises a first presentation subarea where icon symbols can be placed.

29. The computer-readable medium of claim 25, wherein the code providing module provides code in a language selected from the group consisting of hypertext markup language (HTML), extensible markup language (XML), extensible hypertext markup language (XHTML), wireless application markup language (WML), Standard Generalized Markup Language (SGML), Java, and JavaScript.

30. The computer-readable medium of claim 25, wherein the code providing module provides the markup language code in extensible markup language and subsequently converts the markup language code to hypertext markup language.

31. The computer-readable medium of claim 25, wherein the second icon symbol is located in a plurality of presentation areas nested within each other, and wherein the interaction code provides that when the simulated navigation between the first and second objects occurs, the prototype page will display the second picture and those of the plurality of presentation areas that are not already displayed.

* * * * *